July 29, 1947.  A. P. KEIERLEBER  2,424,829
CABLE CLAMP
Filed Nov. 26, 1945
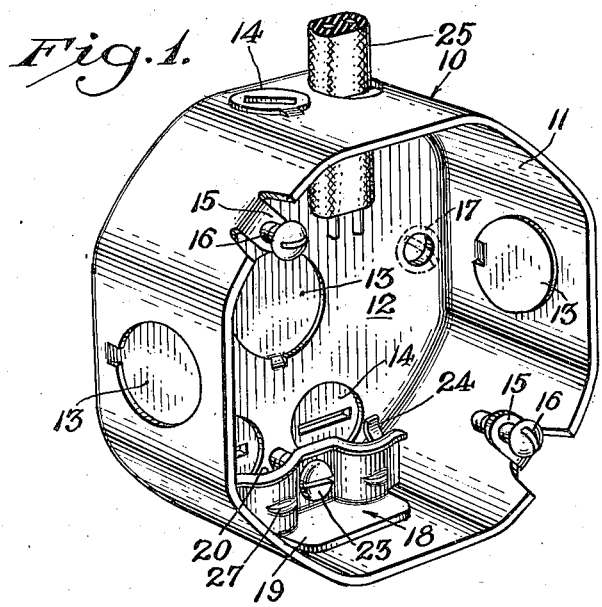
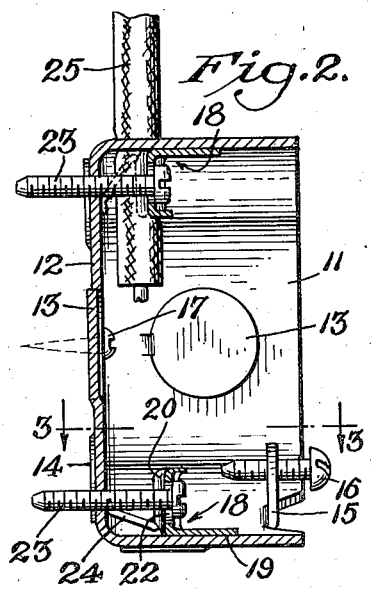
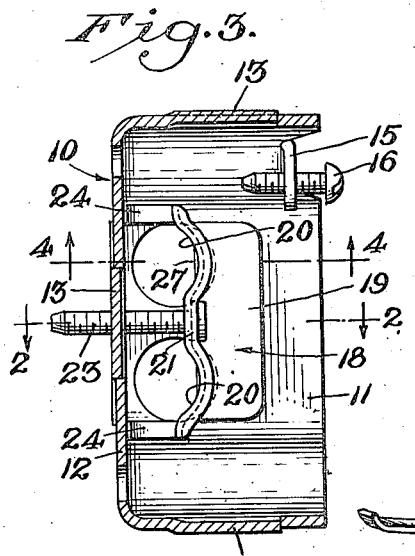
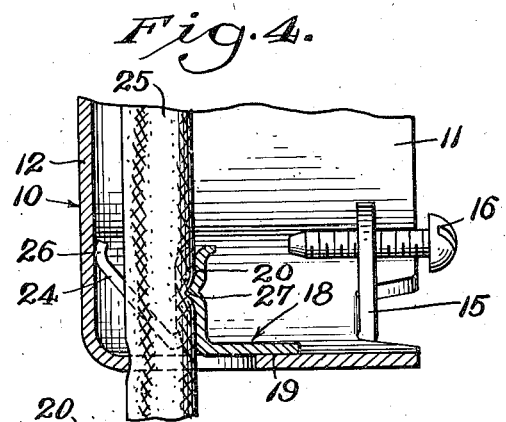
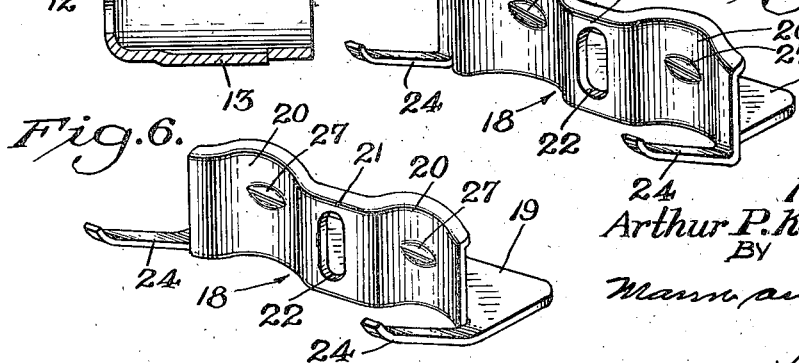
Inventor
Arthur P. Keierleber
By
Mann and Brown
Attorneys.

Patented July 29, 1947

2,424,829

UNITED STATES PATENT OFFICE 2,424,829

CABLE CLAMP

Arthur P. Keierleber, Aurora, Ill., assignor to All-Steel-Equip Company, a corporation of Illinois Application November 26, 1945, Serial No. 630,804

2 Claims. (Cl. 285—24.5)

This invention relates to a cable clamp for outlet boxes, switch boxes, and the like, and is particularly suited for use with nonmetallic, flexible cable.

When nonmetallic electric cable is brought into an outlet or switch box it must be anchored to the box before the electrical connections are made within the box. This is generally done by means of a clamp that is forced into engagement with the cable by a screw in threaded engagement with a wall of the box. For greatest convenience the clamp should be normally retained in open position to facilitate the insertion of the cable, and the principal object of this invention is to provide a simple, inexpensive clamp possessed of this feature.

Further and other objects and advantages will become apparent as the disclosure proceeds and the description is read in conjunction with the accompanying drawings in which Fig. 1 is a perspective view of an outlet box into which is incorporated a preferred embodiment of the cable clamp;

Fig. 2 is a vertical sectional view taken on the line 2—2 of Fig. 3;

Fig. 3 is a horizontal sectional view taken on the line 3—3 of Fig. 2;

Fig. 4 is an enlarged fragmentary view showing the manner in which the clamp grips the cable;

Fig. 5 is a perspective view of the cable clamp; and

Fig. 6 shows a modification thereof.

In the embodiment of the invention chosen for illustration, the cable clamp is shown applied to an octagonal outlet box, generally designated 10, having side walls 11 and a bottom wall, or floor 12. Numerous knockouts 13 and pryouts 14 are provided for the introduction of electrical conduit into the box from various angles, and the top margin of the box is provided with bent-over ears 15 through which screws 16 pass for a convenient mounting of a cover plate, not shown. The box is fastened to a stud, or other building framing member, by screws 17.

The cable clamp of this invention is particularly suited for use with nonmetallic or loom cable, although its use is not necessarily limited to this type of cable. The clamp is generally designated 18, and in the embodiment shown it comprises a single stamped member having a flat wall 19 adapted to rest against and slide upon the side wall 11 of the box, two cable gripping portions 20, shaped to conform with the curvature of the cable and connected by a web 21 slotted at 22 to receive a screw 23 in threaded engagement with the bottom wall 12 of the box.

The clamp 18 is also provided with one or more distortable legs 24, preferably integral with the rest of the clamp. These legs rest upon the floor 12 of the box and serve as spacers to maintain the clamp 18 a given distance above the floor of the box. This distance is such that when electrical cable, such as shown at 25, is introduced into the box through one of the openings formed by removal of a knockout or pryout, the clamp is maintained in a sufficiently open position that introduction of the cable into the box, between the cable clamp 18 of the floor of the box can be accomplished with ease. The clamp is then screwed down upon the cable by turning the screw 23, and the spacer legs 24, which are formed at slightly less than a 90° angle with respect to the plane of the web 21, are caused to bend to a more acute angle as the curved feet 26 slide along the floor of the box. By this simple means the clamp is retained in open position until the cable is inserted in place and then the clamp is screwed down to grip the cable but without interference from the spacer legs 24 because of their ready deformation to the acute angle shown at the top of Fig. 2. The open position of the clamp is indicated by the bottom clamp illustrated in Fig. 2.

Preferably each of the cable gripping portions of the clamp are provided with a transverse rib 27 to cause the clamp to more firmly grip the cable.

The distortable legs 24 may also be an extension of the flat wall portion 19 and sheared from the cable gripping portions 20 as shown in Fig. 6.

The invention may be variously embodied within the scope of the appended claims.

I claim:

1. A cable clamp for use with an outlet box or the like, comprising a single sheet of metal having an outwardly extending wall portion adapted to bear against a side wall of said box, a cable gripping portion at right angles to the wall portion having a plurality of concave depresssions therein to receive a cable and clamp it to the box, and legs flanking such depressions in the cable gripping portion and bent from one of said portions toward the floor of the box but making other than a right angle with respect thereto whereby when the clamp is forced toward the floor to grip a cable to the box the bottom of the legs slide along the floor of the box, causing the legs to bend and change their angle of inclination with respect to the floor of the box.

2. A cable clamp for use with an outlet box or the like, comprising a single sheet of metal having an outwardly extending wall portion adapted to bear against a side wall of said box, a cable gripping portion at right angles to the wall portion having a plurality of concave depressions therein to receive a cable and clamp it to the box, legs flanking such depressions in the cable gripping portion and bent from one of said portions toward the floor of the box but making other than a right angle with respect thereto whereby when the clamp is forced toward the floor to grip a cable to the box the bottom of the legs slide along the floor of the box, causing the legs to bend and change their angle of inclination with respect to the floor of the box, and rounded feet on said legs to facilitate slippage of the legs along the floor of the box.

ARTHUR P. KEIERLEBER.

REFERENCES CITED

The following references are of record in the file of this patent:

UNITED STATES PATENTS

| Number | Name | Date |
|---|---|---|
| 2,260,806 | Henchman | Oct. 28, 1941 |

FOREIGN PATENTS

| Number | Country | Date |
|---|---|---|
| 427,087 | Great Britain | Apr. 16, 1935 |